(12) United States Patent
Chang

(10) Patent No.: US 10,684,425 B2
(45) Date of Patent: Jun. 16, 2020

(54) MPO MICROLATCH LOCK CONNECTOR

(71) Applicant: Senko Advanced Components, Inc., Marlborough, MA (US)

(72) Inventor: Jimmy Jun-Fu Chang, Worcester, MA (US)

(73) Assignee: Senko Advanced Components, Inc, Marlborough, MA (US)

( * ) Notice: Subject to any disclaimer, the term of this patent is extended or adjusted under 35 U.S.C. 154(b) by 0 days.

(21) Appl. No.: 16/513,149

(22) Filed: Jul. 16, 2019

(65) Prior Publication Data

US 2019/0339463 A1 Nov. 7, 2019

Related U.S. Application Data

(63) Continuation of application No. 15/963,500, filed on Apr. 26, 2018, now Pat. No. 10,401,576, which is a
(Continued)

(51) Int. Cl.
*G02B 6/38* (2006.01)

(52) U.S. Cl.
CPC ......... *G02B 6/3893* (2013.01); *G02B 6/3831* (2013.01); *G02B 6/3869* (2013.01);
(Continued)

(58) Field of Classification Search
CPC .. G02B 6/3825; G02B 6/3831; G02B 6/3849; G02B 6/3869; G02B 6/3873;
(Continued)

(56) References Cited

U.S. PATENT DOCUMENTS

| 4,327,964 A | 5/1982 | Haesly et al. |
| 4,478,473 A | 10/1984 | Frear |

(Continued)

FOREIGN PATENT DOCUMENTS

| CA | 2495693 A1 | 4/2004 |
| CN | 2836038 Y | 11/2006 |

(Continued)

OTHER PUBLICATIONS

European Search Report and Written Opinion dated Mar. 3, 2015 for EP 14187661.
(Continued)

*Primary Examiner* — Michael P Mooney
(74) *Attorney, Agent, or Firm* — Edward S. Jarmolowicz, Esq.

(57) ABSTRACT

Optical fiber connectors and adapters are disclosed. A connector includes a flat pin assembly including a pin, a mechanical transfer ferrule boot disposed around at least a portion of the assembly, a housing disposed around at least a portion of the ferrule, and a locking plate. The housing includes first, second, top, and bottom sides. The first and second sides include a recess. The top side includes a groove. The locking plate includes a fastening mechanism configured to interlock with the groove. An optical fiber adapter includes first and second adapter ends each having one or more connecting arms to secure a separate optical fiber connector.

4 Claims, 12 Drawing Sheets

Related U.S. Application Data continuation-in-part of application No. 15/613,674, filed on Jun. 5, 2017, now Pat. No. 10,146,016.

(60) Provisional application No. 62/504,154, filed on May 10, 2017.

(52) U.S. Cl.
CPC .......... *G02B 6/3885* (2013.01); *G02B 6/3825* (2013.01); *G02B 6/3849* (2013.01); *G02B 6/3882* (2013.01)

(58) Field of Classification Search
CPC .. G02B 6/3882; G02B 6/3885; G02B 6/3887; G02B 6/3893; A44B 13/02; H01R 24/00; H01R 31/08; H01R 13/62; H01R 13/6205; H01R 13/6272; H01R 13/6273; H01R 13/639
USPC ............... 385/53–87; 439/333, 362, 365
See application file for complete search history.

(56) References Cited

U.S. PATENT DOCUMENTS

| | | | |
|---|---|---|---|
| 4,762,388 A | 8/1988 | Tanaka et al. |
| 4,764,129 A | 8/1988 | Jones et al. |
| 4,840,451 A | 6/1989 | Sampson et al. |
| 4,872,736 A | 10/1989 | Myers et al. |
| 4,979,792 A | 12/1990 | Weber et al. |
| 5,041,025 A | 8/1991 | Haitmanek |
| D323,143 S | 1/1992 | Ohkura et al. |
| 5,129,024 A | 7/1992 | Honma |
| 5,212,752 A | 5/1993 | Stephenson et al. |
| 5,214,731 A | 5/1993 | Chang |
| 5,265,181 A | 11/1993 | Chang |
| 5,289,554 A | 2/1994 | Cubukciyan et al. |
| 5,317,663 A | 5/1994 | Beard et al. |
| 5,335,301 A | 8/1994 | Newman et al. |
| 5,348,487 A | 9/1994 | Marazzi et al. |
| 5,444,806 A | 8/1995 | deMarchi et al. |
| 5,481,634 A | 1/1996 | Anderson et al. |
| 5,506,922 A | 4/1996 | AnGrois et al. |
| 5,521,997 A | 5/1996 | Rovenolt et al. |
| 5,570,445 A | 10/1996 | Chou et al. |
| 5,588,079 A | 12/1996 | Tanabe et al. |
| 5,684,903 A | 11/1997 | Kyomasu et al. |
| 5,687,268 A | 11/1997 | Stephenson et al. |
| 5,781,681 A | 7/1998 | Manning |
| 5,937,130 A | 8/1999 | Amberg et al. |
| 5,956,444 A | 9/1999 | Duda et al. |
| 5,971,626 A | 10/1999 | Knodell et al. |
| 6,041,155 A | 3/2000 | Anderson et al. |
| 6,049,040 A | 4/2000 | Biles et al. |
| 6,134,370 A | 10/2000 | Childers et al. |
| 6,178,283 B1 | 1/2001 | Weigel |
| RE37,080 E | 3/2001 | Stephenson et al. |
| 6,206,577 B1 | 3/2001 | Hall, III et al. |
| 6,206,581 B1 | 3/2001 | Driscoll et al. |
| 6,227,717 B1 | 5/2001 | Ott et al. |
| 6,238,104 B1 | 5/2001 | Yamakawa et al. |
| 6,247,849 B1 | 6/2001 | Liu |
| 6,290,527 B1 | 9/2001 | Takaya |
| 6,347,888 B1 | 2/2002 | Putez |
| 6,371,657 B1 | 4/2002 | Chen et al. |
| 6,461,054 B1 | 10/2002 | Iwase |
| 6,471,412 B1 | 10/2002 | Belenkiy et al. |
| 6,478,472 B1 | 11/2002 | Anderson et al. |
| 6,551,117 B2 | 4/2003 | Poplawski et al. |
| 6,579,014 B2 | 6/2003 | Melton et al. |
| 6,634,801 B1 | 10/2003 | Waldron et al. |
| 6,648,520 B2 | 11/2003 | McDonald et al. |
| 6,682,228 B2 | 1/2004 | Rathnam et al. |
| 6,685,362 B2 | 2/2004 | Burkholder et al. |
| 6,695,486 B1 | 2/2004 | Falkenberg |
| 6,705,765 B2 | 3/2004 | Lampert et al. |
| 6,785,460 B2 | 8/2004 | de Jong |
| 6,854,894 B1 | 2/2005 | LamperYunker et al. |
| 6,872,039 B2 | 3/2005 | Baus et al. |
| 6,935,789 B2 | 8/2005 | Gross, III et al. |
| 7,020,376 B1 | 3/2006 | Dang |
| 7,090,406 B2 | 8/2006 | Melton et al. |
| 7,090,407 B2 | 8/2006 | Melton et al. |
| 7,091,421 B2 | 8/2006 | Kukita et al. |
| 7,111,990 B2 | 9/2006 | Melton et al. |
| 7,113,679 B2 | 9/2006 | Melton et al. |
| D533,504 S | 12/2006 | Lee |
| D534,124 S | 12/2006 | Taguchi |
| 7,150,567 B1 | 12/2006 | Luther et al. |
| 7,153,041 B2 | 12/2006 | Mine et al. |
| 7,198,409 B2 | 4/2007 | Smith et al. |
| 7,207,724 B2 | 4/2007 | Gurreri |
| D543,146 S | 5/2007 | Chen et al. |
| 7,258,493 B2 | 8/2007 | Milette |
| 7,281,859 B2 | 10/2007 | Mudd et al. |
| D558,675 S | 1/2008 | Chien et al. |
| 7,315,682 B1 | 1/2008 | En Lin et al. |
| 7,325,976 B2 | 2/2008 | Gurreri et al. |
| 7,325,980 B2 | 2/2008 | Pepe |
| 7,329,137 B2 | 2/2008 | Martin et al. |
| 7,331,718 B2 | 2/2008 | Yazaki et al. |
| 7,354,291 B2 | 4/2008 | Caveney et al. |
| 7,371,082 B2 | 5/2008 | Zimmel et al. |
| 7,387,447 B2 | 6/2008 | Mudd et al. |
| 7,390,203 B2 | 6/2008 | Murano et al. |
| D572,661 S | 7/2008 | En Lin et al. |
| 7,431,604 B2 | 10/2008 | Waters et al. |
| 7,463,803 B2 | 12/2008 | Cody et al. |
| 7,465,180 B2 | 12/2008 | Kusuda et al. |
| 7,510,335 B1 | 3/2009 | Su et al. |
| 7,513,695 B1 | 4/2009 | Lin et al. |
| 7,561,775 B2 | 7/2009 | Lin et al. |
| 7,575,459 B2 | 8/2009 | Nickol |
| 7,594,766 B1 | 9/2009 | Sasser et al. |
| 7,641,398 B2 | 1/2010 | O'Riorden et al. |
| 7,695,199 B2 | 4/2010 | Teo et al. |
| 7,699,533 B2 | 4/2010 | Milette |
| 7,824,113 B2 | 11/2010 | Wong et al. |
| 7,837,395 B2 | 11/2010 | Lin et al. |
| D641,708 S | 7/2011 | Yamauchi |
| 8,186,890 B2 | 5/2012 | Lu |
| 8,192,091 B2 | 6/2012 | Hsu |
| 8,202,009 B2 | 6/2012 | Lin et al. |
| 8,224,146 B2 | 7/2012 | Hackett |
| 8,251,733 B2 | 8/2012 | Wu |
| 8,267,595 B2 | 9/2012 | Lin et al. |
| 8,270,796 B2 | 9/2012 | Nhep |
| 8,408,815 B2 | 4/2013 | Lin et al. |
| 8,465,317 B2 | 6/2013 | Gniadek et al. |
| 8,636,424 B2 | 1/2014 | Kuffel et al. |
| 8,651,749 B2 | 2/2014 | Dainese Junior et al. |
| 8,770,863 B2 | 7/2014 | Cooke et al. |
| 8,855,458 B2 | 10/2014 | Belenkly |
| 8,915,653 B2 | 12/2014 | Haley |
| 9,188,747 B2 | 11/2015 | Gniadek |
| 9,239,437 B2 | 1/2016 | Belenkly |
| 9,411,110 B2 | 8/2016 | Barnette et al. |
| 9,494,744 B2 | 11/2016 | de Jong |
| 9,548,557 B2 | 1/2017 | Lui |
| 9,551,842 B2 | 1/2017 | Theuerkorn |
| 9,568,686 B2 | 2/2017 | Fewkes et al. |
| 9,581,768 B1 | 2/2017 | Baca et al. |
| 9,684,313 B2 | 6/2017 | Cline et al. |
| 9,798,090 B2 | 10/2017 | Takano et al. |
| 2003/0053787 A1 | 3/2003 | Lee |
| 2003/0095754 A1 | 5/2003 | Matsumoto et al. |
| 2004/0052473 A1 | 3/2004 | Seo et al. |
| 2004/0136657 A1 | 7/2004 | Ngo |
| 2004/0141693 A1 | 7/2004 | Szilagyi et al. |
| 2004/0161958 A1 | 8/2004 | Togami et al. |
| 2004/0234209 A1 | 11/2004 | Cox et al. |
| 2004/0264873 A1 | 12/2004 | Smith |
| 2005/0111796 A1 | 5/2005 | Matasek et al. |
| 2005/0141817 A1 | 6/2005 | Yazaki et al. |
| 2006/0089049 A1 | 4/2006 | Sedor |

(56) References Cited

U.S. PATENT DOCUMENTS

| | | |
|---|---|---|
| 2006/0127025 A1 | 6/2006 | Haberman |
| 2006/0269194 A1 | 11/2006 | Luther et al. |
| 2006/0274411 A1 | 12/2006 | Yamauchi |
| 2007/0028409 A1 | 2/2007 | Yamada |
| 2007/0079854 A1 | 4/2007 | You |
| 2007/0098329 A1 | 5/2007 | Shimoji |
| 2007/0149062 A1 | 6/2007 | Long et al. |
| 2007/0230874 A1 | 10/2007 | Lin |
| 2007/0232115 A1 | 10/2007 | Burke et al. |
| 2007/0243749 A1 | 10/2007 | Wu |
| 2008/0008430 A1 | 1/2008 | Kewitsch |
| 2008/0044137 A1 | 2/2008 | Luther et al. |
| 2008/0069501 A1 | 3/2008 | Mudd et al. |
| 2008/0101757 A1 | 5/2008 | Lin et al. |
| 2008/0226237 A1 | 9/2008 | O'Riorden et al. |
| 2008/0267566 A1 | 10/2008 | Lin et al. |
| 2009/0022457 A1 | 1/2009 | De Jong et al. |
| 2009/0028507 A1 | 1/2009 | Jones et al. |
| 2009/0092360 A1 | 4/2009 | Lin et al. |
| 2009/0196555 A1 | 8/2009 | Lin et al. |
| 2009/0214162 A1 | 8/2009 | O'Riorden et al. |
| 2009/0220197 A1 | 9/2009 | Gniadek |
| 2009/0226140 A1 | 9/2009 | Belenkly |
| 2009/0290938 A1 | 11/2009 | Lin |
| 2010/0034502 A1 | 2/2010 | Lu et al. |
| 2010/0247041 A1 | 9/2010 | Szilagyi |
| 2010/0322561 A1 | 12/2010 | Lin et al. |
| 2011/0044588 A1 | 2/2011 | Larson et al. |
| 2011/0131801 A1 | 6/2011 | Nelson et al. |
| 2011/0177710 A1 | 7/2011 | Tobey |
| 2012/0099822 A1 | 4/2012 | Kuffel et al. |
| 2012/0189260 A1 | 7/2012 | Kowalczyk et al. |
| 2012/0269485 A1 | 10/2012 | Haley et al. |
| 2012/0301080 A1 | 11/2012 | Gniadek |
| 2013/0071067 A1 | 3/2013 | Lin |
| 2013/0089995 A1 | 4/2013 | Gniadek et al. |
| 2013/0094816 A1 | 4/2013 | Lin et al. |
| 2013/0121653 A1 | 5/2013 | Shitama et al. |
| 2013/0183012 A1 | 7/2013 | Cabanne Lopez et al. |
| 2013/0322825 A1 | 12/2013 | Cooke et al. |
| 2014/0016901 A1 | 1/2014 | Lambourn et al. |
| 2014/0023322 A1 | 1/2014 | Gniadek et al. |
| 2014/0050446 A1 | 2/2014 | Chang |
| 2014/0133808 A1 | 5/2014 | Hill et al. |
| 2014/0219621 A1 | 8/2014 | Barnette et al. |
| 2014/0226946 A1 | 8/2014 | Cooke et al. |
| 2014/0241678 A1 | 8/2014 | Brinquier et al. |
| 2014/0241688 A1 | 8/2014 | Isenhour et al. |
| 2014/0270646 A1 | 9/2014 | Haley |
| 2014/0334780 A1 | 11/2014 | Nguyen et al. |
| 2014/0348477 A1 | 11/2014 | Chang |
| 2015/0078717 A1 | 3/2015 | Lin |
| 2015/0301294 A1 | 10/2015 | Chang |
| 2015/0331201 A1 | 11/2015 | Takano et al. |
| 2015/0355417 A1* | 12/2015 | Takano ........... G02B 6/3825 385/60 |
| 2015/0378113 A1 | 12/2015 | Good et al. |
| 2016/0172852 A1 | 6/2016 | Takano |
| 2016/0291262 A1 | 6/2016 | Chang |
| 2016/0195682 A1 | 7/2016 | Takano |
| 2016/0266326 A1 | 9/2016 | Gniadek |
| 2016/0320572 A1 | 11/2016 | Gniadek |
| 2016/0131849 A1 | 12/2016 | Takano |
| 2017/0003458 A1 | 1/2017 | Gniadek |

FOREIGN PATENT DOCUMENTS

| | | |
|---|---|---|
| CN | 201383588 Y | 1/2010 |
| CN | 2026500189 U | 12/2013 |
| DE | 202006011910 U1 | 3/2007 |
| DE | 102006019335 A1 | 10/2007 |
| EP | 1074868 A1 | 7/2001 |
| EP | 1211537 A2 | 6/2002 |
| EP | 1245980 A2 | 10/2002 |
| EP | 1566674 A1 | 8/2005 |
| GB | 2111240 A | 6/1983 |
| JP | 2009229545 A | 10/2009 |
| JP | 2009276493 A | 11/2009 |
| TW | 200821653 A | 5/2008 |
| WO | 2001/79904 A2 | 10/2001 |
| WO | 2004/027485 A1 | 4/2004 |
| WO | 2008/112986 A1 | 9/2008 |
| WO | 2009/135787 A1 | 11/2009 |
| WO | 2010/024851 A2 | 3/2010 |
| WO | 2012/136702 A1 | 10/2012 |
| WO | 2012/162385 A1 | 11/2012 |
| WO | 2014/028527 A1 | 2/2014 |
| WO | 2014/182351 A1 | 11/2014 |
| WO | 2015/191024 A1 | 12/2015 |
| WO | 2016/148741 A1 | 9/2016 |

OTHER PUBLICATIONS

European Search Report and Written Opinion dated Feb. 19, 2015 for EP 14168005.

"Fiber Optic Connectors and Assemblies Catalog" 2009, Huber & Suhner Fiber Optics, Herisau, Switzerland, www.google.co.in/url?sa=t&source=web&cd=63&ved=0CCMQFjACODw&url=http%3A%2F%2Fwww.hubersuhner.com%2Fwrite_rtn_binary.pdf%3Fbinaryid%3D8DBC7DE2EB72D315%26binarytype%3D48403DAA363AEB7E&ei=ZvcvTujWH4ntrAfH-dXZCg&usg=AFQjCNE1MdC-4avewRJU6IDVc_WYbr0QQ.

"Fiber Optic Interconnect Solutions, Tactical Fiber Optic Connectors, Cables and Termini" 2006, Glenair, Inc., Glendale, California, www.mps-electronics.de/fileadmin/files/MPS-E/Produkte/Katalog/Glenair/Katalog¬Glenair¬LWL-1110.pdf.

"Fiber Optic Products Catalog" Nov. 2007, Tyco Electronics Corporation, Harrisburg, Pennsylvania, www.ampnetconnect.com/documents/Fiber%20Optics%20Catalog%201107.pdf.

International Search Report and Written Opinion dated Apr. 27, 2012 for PCT/US2011/058799.

International Search Report and Written Opinion dated Aug. 27, 2012 for PCT/US2012/039126.

International Search Report and Written Opinion dated Jan. 16, 2014 for PCT/US2013/54784.

International Search Report and Written Opinion dated Aug. 29, 2014 for PCT/US2014/041500.

International Search Report and Written Opinion dated May 14, 2014 for PCT/US2014/012137.

International Search Report and Written Opinion dated Aug. 21, 2008 for PCT/US2008/057023.

International Preliminary Report on Patentability dated Sep. 14, 2017 from related International Application No. PCT/US2015/059458, International Filing Date Nov. 6, 2015.

International Search Report (ISR) WO2008112986 dated Sep. 15, 2009.

ISR WO2012162385ISR Nov. 29, 2012.

ISR WO2014028527ISR Jul. 16, 2015.

ISR WO2015191024ISR Oct. 9, 2014.

ISR WO2015US57610ISR Sep. 22, 2016.

ISR WO2016176083ISR May 19, 2016.

ISR WO2016148741ISR Sep. 22, 2016.

Non-Final Office action for U.S. Appl. No. 15/613,674, dated Jun. 15, 2018, 8 pages.

* cited by examiner

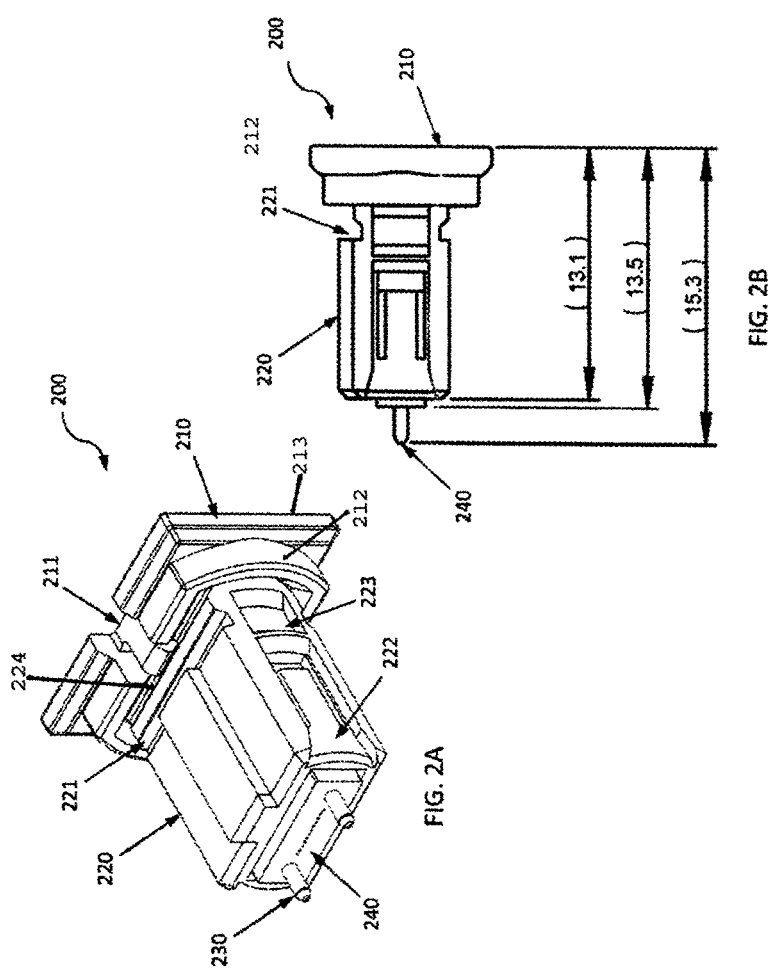

MPO MICROLATCH LOCK CONNECTOR

CROSS-REFERENCE TO RELATED APPLICATIONS

This application claims is a continuation of U.S. patent application Ser. No. 15/963,500 filed on Apr. 26, 2018, which is a continuation-in-part of U.S. patent application Ser. No. 15/613,674 filed on Jun. 5, 2017, now U.S. Pat. No. 10,146,016, titled "MPO Micro-Latchock Connector", granted on Dec. 4, 2018, which claims priority to U.S. Pat. Application No. 62/504,154, filed May 10, 2017.

BACKGROUND

The field of invention of the present disclosure relates generally to fiber optic connectors, and more specifically to low profile optical-fiber connectors with latch-lock connectors.

The prevalence of the Internet has led to unprecedented growth in communication networks. Consumer demand for service and increased competition has caused network providers to continuously find ways to improve quality of service while reducing cost.

Certain solutions have included deployment of high-density interconnect panels. High-density interconnect panels may be designed to consolidate the increasing volume of interconnections necessary to support data networks in a compacted form factor, thereby increasing quality of service and decreasing costs such as floor space and support overhead. However, the deployment of high-density interconnect panels have not been fully realized.

In communication networks, such as data centers and switching networks, numerous interconnections between mating connectors may be compacted into high-density panels. Panel and connector producers may optimize for such high densities by shrinking the connector size and/or the spacing between adjacent connectors on the panel. While both approaches may be effective to increase the panel connector density, shrinking the connector size and/or spacing may also increase support cost and diminish quality of service.

In a high-density panel configuration, adjacent connectors and cable assemblies may be close to one another and thus interfere with access to adjacent connectors. Overstressing the cables and connectors may produce latent defects, compromise the integrity and/or reliability of the terminations, and potentially cause serious disruptions to network performance.

While an operator may attempt to use a tool, such as a screwdriver, to reach into a dense group of connectors and activate a release mechanism, adjacent cables and connectors may obstruct the operator's line of sight, making it difficult to guide the tool to the release mechanism without pushing aside the adjacent cables. Moreover, even when the operator has a clear line of sight, guiding the tool to the release mechanism may be a time-consuming process. Thus, using a tool may not be effective at reducing support time and increasing quality of service.

Small Form Factor Pluggable Transceivers (SFP) are used presently in telecommunication infrastructures within rack-mounted copper-to-fiber media converters, Ethernet switches, and/or patching hubs. Ethernet and fiber optic connections are evolving quickly to increase connection density due to limited space for such equipment. Although fiber optic connectors have become smaller over the years, they have not been designed to be any smaller than necessary to plug into commonly sized and readily available SFPs. However, as transceiver technologies develop, smaller SFPs will be used to create higher density switches and/or patching hub equipment. Accordingly, there is a need for fiber optic connectors that will satisfy the form factors for smaller SFPs.

SUMMARY

Embodiments disclosed herein address the aforementioned shortcomings by providing optical fiber connectors that have a relatively low profile including a latch-lock connector and locking plate. In some embodiments, a connector system may include an adapter.

In summary, the present disclosure provides an optical fiber connector having a flat pin assembly with at least one pin for a male ferrule configuration or no pins for female ferrule configuration. The optical fiber connector may also have a mechanical transfer ferrule boot and at least a portion of the flat pin assembly attached to the ferrule, and a housing disposed around at least a portion of the mechanical transfer ferrule. The present disclosure provides further details regarding the housing having a first side, a second side, a top side, and a bottom side, wherein each of the first side and the second side includes at least one recess, and the top side includes at least one groove. Also, the top or bottom side may have a plural of grooves corresponding to a number of fastening mechanisms configured as part of a locking plate. Additionally, the optical connector may have a locking plate with one or more fastening mechanisms each configured to interlock with the at least one groove.

The present disclosure also provides an optical fiber adapter having a first adapter end configured to receive a first optical fiber connector with one or more first connecting arms, and a second adapter end configured to receive a second optical fiber connector with one or more second connecting arms. In some embodiments, the adapter 760 may couple the second optical fiber connector to the first optical fiber connector.

Further presented herein is a system having both an optical fiber connector and an optical fiber adapter. The optical fiber connector includes a flat pin assembly with at least one pin for a male ferrule configuration or no pins for a female ferrule configuration. The optical fiber connector may also have a mechanical transfer ferrule boot and at least a portion of the flat pin assembly attached to the mechanical transfer ferrule boot, and a housing disposed around at least a portion of the mechanical transfer ferrule. The present disclosure provides further details regarding the housing having a first side, a second side, a top side, and a bottom side, wherein each of the first side and second side includes at least one recess, and the top side includes at least one first groove. Additionally, the optical connector may have a locking plate with one or more first fastening mechanisms each configured to interlock with the at least one first groove. The optical fiber adapter includes a first adapter end configured to receive a first optical fiber connector with one or more first connecting arms, and a second adapter end configured to receive a second optical fiber connector with one or more second connecting arms. In some embodiments, the adapter may couple the second optical fiber connector to the first optical fiber connector.

Further presented herein, the locking plate moves along a longitudinal axis of the micro-latchlock connector. The longitudinal axis is defined as a proximal end at dust cover 150 (FIG. 1), and distal end at locking plate 110 (FIG. 1). Pushing locking plate 110 toward proximal end until it stops, locks connector 200 within an adapter housing 760 (FIG. 7). Pulling locking plate 110 toward a distal end, unlocks connector from adapter housing, thereby, allowing a user to remove the connector from within adapter.

The foregoing, as well as additional objects, features and advantages of the present disclosure will be more apparent from the following detailed description, which proceeds with reference to the accompanying drawings.

BRIEF DESCRIPTION OF THE DRAWINGS

FIG. 2A is a perspective view of a multi-fiber push on (MPO) micro-latch-lock connector in an unlocked position.

FIG. 2B is a side view of a multi-fiber push on (MPO) micro-latch-lock connector in an unlocked position.

DETAILED DESCRIPTION

Figure 1:
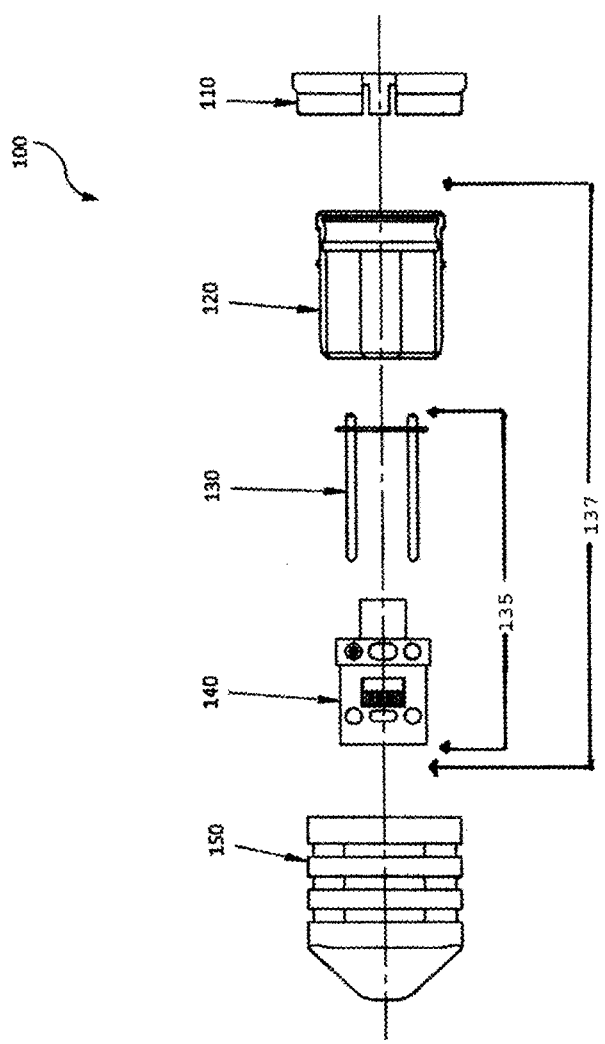
FIG. 1 is an exploded view of a multi-fiber push on (MPO) micro-latch-lock connector.

This disclosure is not limited to the particular systems, devices and methods described, as these may vary. The terminology used in the description is for the purpose of describing the particular versions or embodiments only and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

The following terms shall have, for the purposes of this application, the respective meanings set forth below.

A "connector," as used herein, refers to a device and/or components thereof that connects a first module or cable to a second module or cable. The connector may be configured for fiber optic transmission or electrical signal transmission. The connector may be any suitable type now known or later developed, such as, for example, a ferrule connector (FC), a fiber distributed data interface (FDDI) connector, an LC connector, a mechanical transfer (MT) connector, a square connector (SC) connector, an SC duplex connector, or a straight tip (ST) connector. The connector may generally be defined by a connector housing body. In some embodiments, the housing body may incorporate any or all of the components described herein.

A "fiber optic cable" or an "optical cable" refers to a cable containing one or more optical fibers for conducting optical signals in beams of light. The optical fibers can be constructed from any suitable transparent material, including glass, fiberglass, and plastic. The cable can include a jacket or sheathing material surrounding the optical fibers. In addition, the cable can be connected to a connector on one end or on both ends of the cable.

The terminal ends of a cable may include a connector used to connect the cable with another cable or other fiber optic devices. A connector may include a housing structure configured to interact with and connect with an adapter. An adapter, among other things, may include two aligned ports that align fiber optic connectors and/or electrical connectors therein. The adapter may be used, for example and without limitation, to align and connect optical fibers end-to-end or to allow for pin/socket electrical connections.

Micro-latch-lock connectors provide a connection interface for industry standard 0.079" (i.e., 2.00 mm) wire-to-board applications. Generally, a micro-latch system includes female crimp terminals, receptacle housings, and semi-shrouded vertical headers. The connector may include a friction lock mechanism by which the noses on the receptacle housings slide into the header wall openings. This ensures a durable mating and protection of the electrical circuits. As disclosed herein, various embodiments may incorporate a micro-latch (i.e., micro-latch lock) system into a low profile fiber optical connector.

Figure 8A:
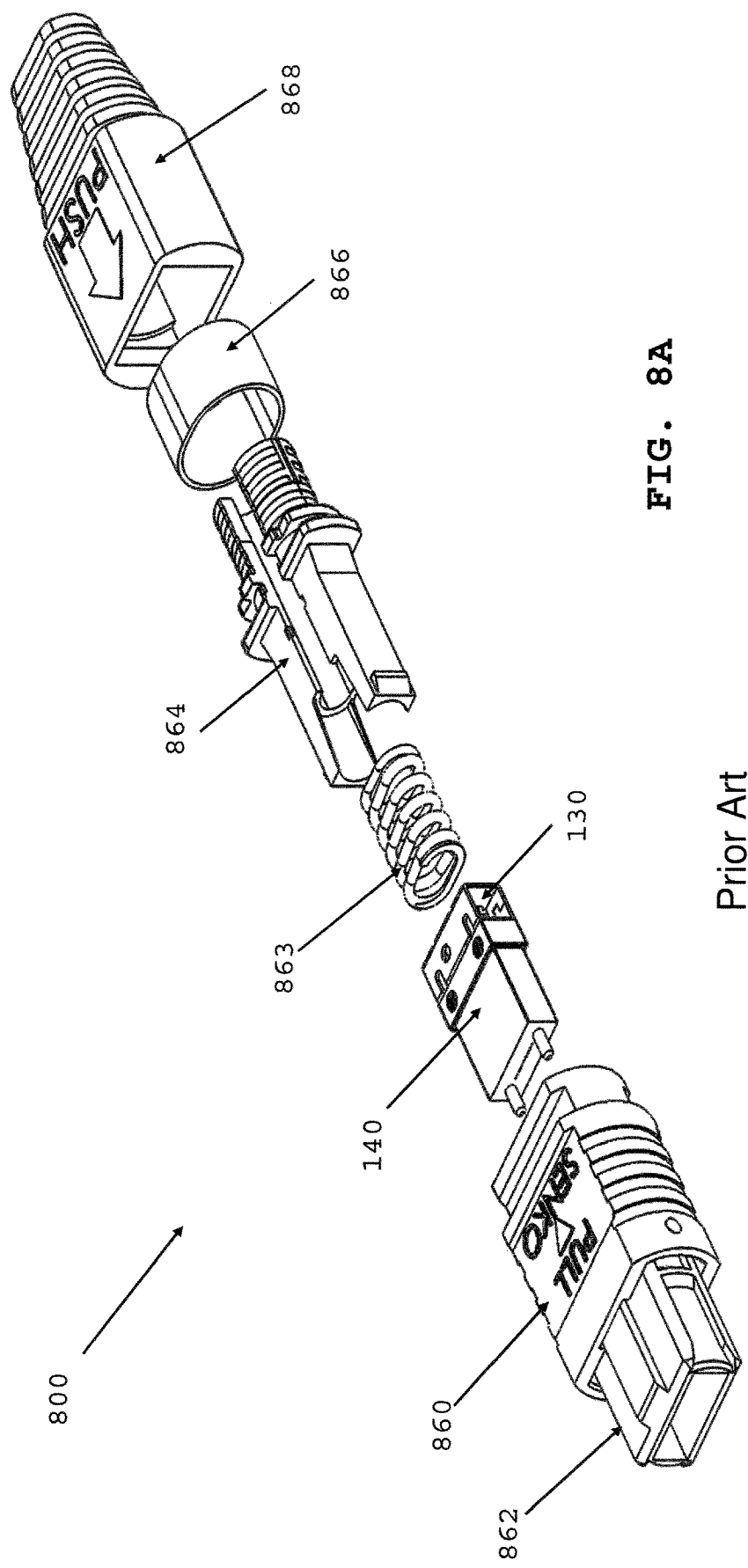
FIG. 8A is an exploded view of a conventional MPO connector.
Figure 8B:
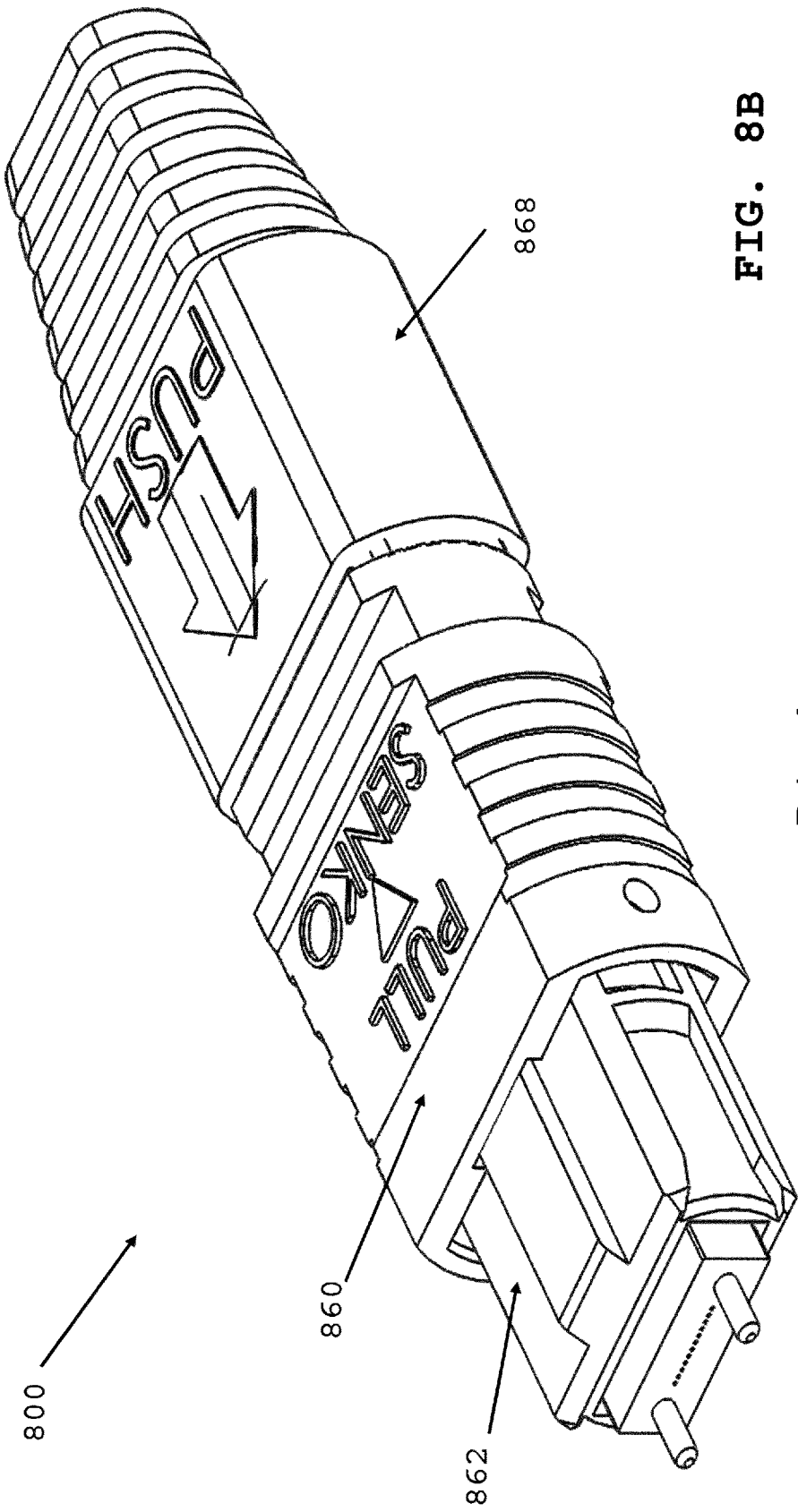
FIG. 8B is a perspective view of a conventional MPO connector.
Figure 8C:
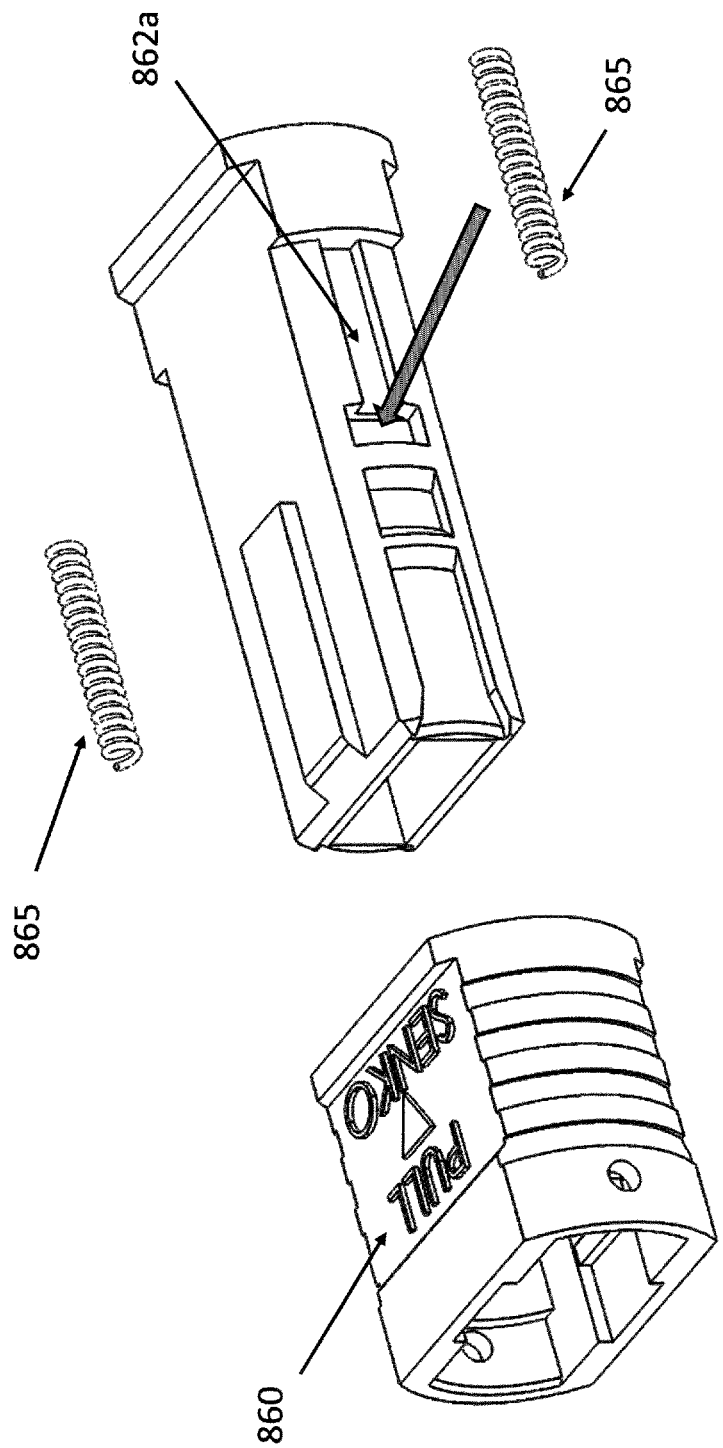
FIG. 8C is an exploded view of an MPO inner and outer housing of FIG. 8B.

Referring to FIGS. 8A and 8B, a conventional multi-fiber push on (MPO) connector 800 has an overall length much greater than the MPO micro connector 137 (refer to FIG. 1) disclosed herein. Length reduction is highly desirable to allow racks of adapters with connectors therein (refer to FIG. 6) to be placed closer together. This reduces data room size. Referring to FIG. 8A, a conventional MPO connector 800 comprises an inner housing 862, outer housing 860, ferrule 140 with pin-keeper 130, spring 863, back body 864, crimp ring 866 and boot 868. Referring to FIG. 8B, when assembled ferrule and pin-keep are inserted in the inner housing 862. The back body 864 accepts spring 863 which is secured with the crimp ring 866, and the boot 868 secures the final assembly. Referring to FIG. 8C, an exploded view of the inner 862 and outer 860 housing further comprises a pair of springs 865. Spring 865 is positioned in slot 862a located on either side of inner housing 862. The springs 865 keep the outer housing 860 in a biased forward position. Use of springs 865 is additional component cost, assembly cost and presents quality issues in the form of repeatability in assembly over micro connector (200, 300) of the present invention, which does not use springs 865.

Figure 5:
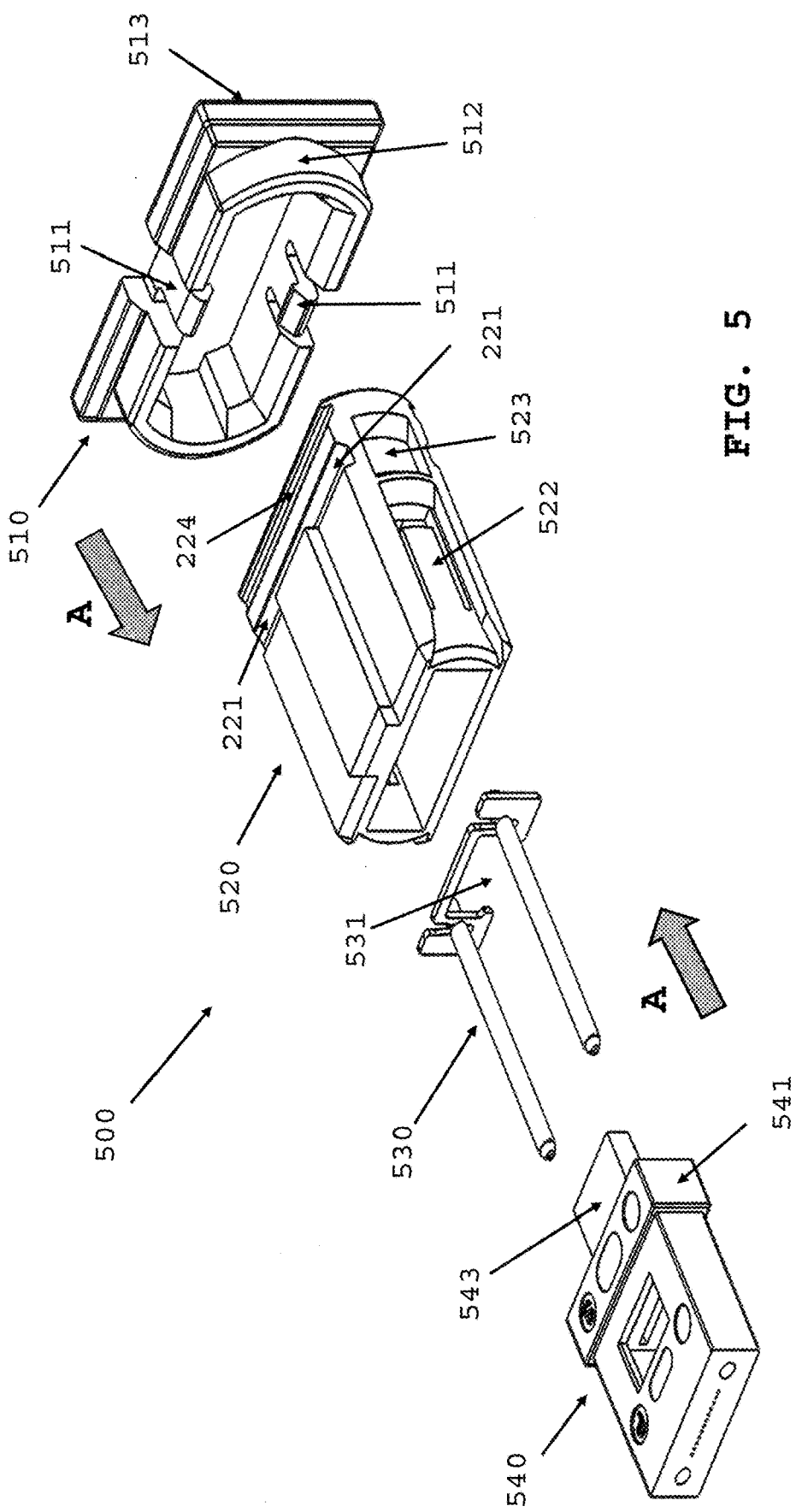
FIG. 5 is a perspective view of an exploded multi-fiber push on (MPO) micro-latch-lock connector.

Referring to FIG. 5 of the present invention, there is a substantial reduction in components and thus assembly time. The removal of spring 863 (FIG. 8A) and springs 862 (FIG. 8B) contribute to connector size reduction, reduced assembly time and component cost. Removing spring 863 also eliminates back body 864, crimp ring 866 and boot 868. In standard use, spring 863 biases the ferrule forward. As explained more fully below, MPO locking plate 510 covers an adapter arm 770 or hook 770 (FIG. 7) that is secured in recess 723. Locking plate prevents adapter arm 770 from releasing under normal cable disruption, and further helps ensure a ferrule assembly 135 (FIG. 1) and its housing 120 is biased forward to ensure minimum insertion loss. The present invention or locking plate allows for expected industry use with a standard industry adapter 660 at a reduced profile or shorter overall length MPO connector.

Accordingly, embodiments as disclosed herein may detail a housing that acts as an adapter in order to allow a multi-fiber push on (MPO) micro connector to fit into a standard adapter. In some embodiments, as shown in FIG. 1, the micro-latch-lock system 100 may comprise a MPO locking plate 110, a MPO low profile connector housing 120, a MPO flat metal pin assembly 130, a mechanical transfer (MT) ferrule boot 140, and a MPO connector dust cap 150. It should be understood that depicted micro-latch-lock system 100 is a non-limiting example of a micro-latch-lock system, and that other systems may include one, all, or some combination of the above-described components of the depicted micro-latch-lock system.

Figure 3A:
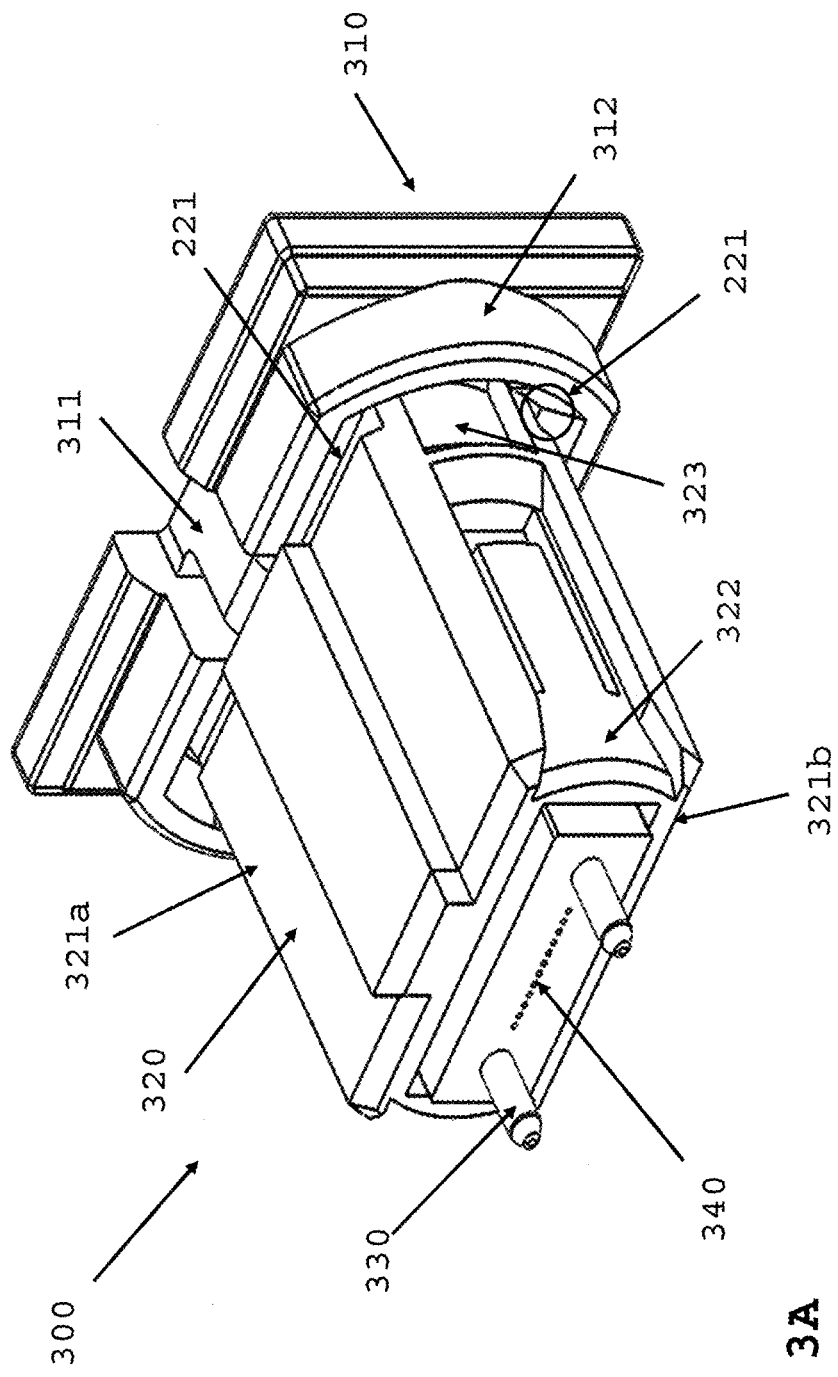
FIG. 3A is a perspective view of a multi-fiber push on (MPO) micro-latch-lock connector in a locked position.
Figure 3B:
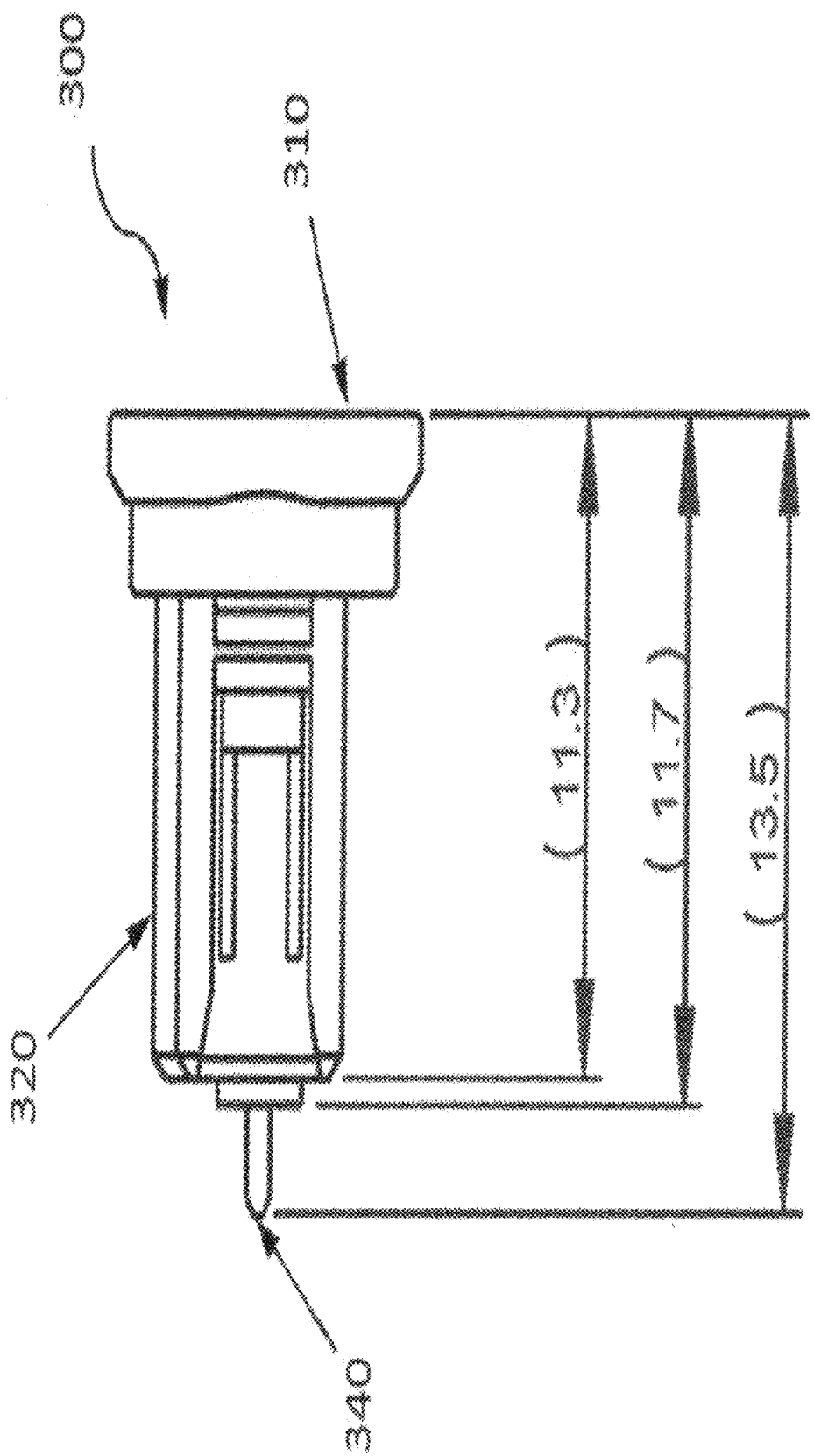
FIG. 3B is a side view of a multi-fiber push on (MPO) micro-latch-lock connector in a locked position.

Generally, as shown in FIG. 8A a standard MPO micro connector is longer than a MPO micro connector of FIG. 2B or 3B. MPO micro connector 137 comprises MT ferrule 140, pin-keep 130, housing 120 and locking plate 110.

Thus, embodiments exist, as shown and described in FIG. 1, where a connector housing 120 may have a locking mechanism. This locking mechanism may serve to "lock" and/or "unlock" the connector 200 of the present invention from an adapter housing 760. Also embodiments provide for locking plate section to act as a guide in securing connector system 100, 200 into an adapter housing 760.

FIGS. 2A and 2B depict an embodiment in an "unlocked" state 200. As shown in FIG. 2A, housing 220 may contain a locking groove 221 and a release groove 224 that both span a substantial width of housing sufficient to secure locking plate 210 and allow its operate as disclosed herein. In a further embodiment, MPO locking plate 210 may include one or more first fastening mechanisms 211 configured to interact with grooves 221 and 224 to attach locking plate 210 to housing 220. In an embodiment, each of a top side and a bottom side of housing 220 includes a locking groove 221, a release groove 224, and can accept a MPO locking plate 210 that may include one or more first fastening mechanisms 211 configured to interact with a groove on a top side of the housing and one or more second fastening mechanisms configured to interact with a groove on a bottom side of the housing (such as is shown in FIG. 2B), as described below. Without departing from the invention, the front side may have one or more grooves, and no grooves on the bottom side, while the top side may have no grooves and the bottom side has one or more grooves. Locking plate 210 further comprises a back surface 213 and a shroud 212 partially extending circumferential and attached to proximal side of the back surface. A proximal position is defined as nearer MT ferrule 240 or front of a connector, while a distal position is further from ferrule 140 or nearer locking plate 210. Shroud 212 partially covers an outer housing recess 223 when locking plate 210 is fully inserted over a distal end of housing 220. In this position, fastening mechanism 211 or latch 211 is engaged in locking groove 221, as shown in FIG. 3A. The back side 213 is used to release locking plate 210 from locking groove 221 by pulling on backside. The role of shroud 212 is discussed more fully below.

As described in FIG. 9 below, latch 911 lifts out of groove 221, engages a ramp surface 918, and as locking plate 910 is pulled from back side 913, in the direction of arrow "A", latch 911 comes to rest in release groove 224. Once in release groove 224 or unlocked position, as shown in FIG. 2A, connector assembly 200 can be removed from adapter as shown installed therein in FIG. 6. Latch 911 is secured in release groove 224 when surface 224a restrains or stops further movement of latch 911.

Referring to FIGS. 1, 2A and 3A, housing 220 may also include one or more outer housing recesses 223 and one or more hooks 222 that interlock with MT ferrule 240. Referring to FIG. 2A, a first side and a second side of housing 220 may each include at least one outer housing recess 223. MT ferrule 240 may have an MPO flat pin assembly 230 within it, and a housing 220 which together comprise MPO micro connector 137. Accordingly, once housing 220 is pushed onto MT ferrule 140 with pin-keep 230 or MT ferrule assembly 135, one or more hooks 222 act as a locking mechanism that engage MT ferrule edge 541 and MPO MT ferrule assembly is secured within connector housing 220. Comparing FIGS. 2B and 3B with FIG. 8B, an overall length of MPO micro connector (200, 300) (FIGS. 2B, 3B respectively) is substantially shorter than a standard MPO connector 800 of FIG. 8B.

FIGS. 3A and 3B depict an embodiment in a "locked" state 300. As shown in FIG. 3A, housing 320 may contain a release groove 224 (not shown) that spans the width of the housing. Release groove 224 is covered by a shroud 312, which is protecting one or more recesses 323. A recess 323 may be located on a side of housing 320. In a further embodiment, MPO locking plate 310 may include one or more first fastening mechanisms 311 or latches 311 configured to interact with release groove 224 (not shown) and attach locking plate 310 to housing 320. In an embodiment, each of a top side 321a and a bottom side 321b of housing 320 may include a release groove 224 (not shown), and MPO locking plate 310 may include one or more first fastening mechanisms 311 configured to interact with a locking groove 221 on a top side of housing 320 and one or more second fastening mechanisms configured to interact with a locking groove 221 on a bottom side of housing 320. Locking groove 221 secures locking plate 210 to a housing 320. The housing 320 may also include one or more hooks 322 that interlock with MT ferrule 340, wherein MT ferrule may have an MPO flat pin assembly 330 within it, together called the MPO micro connector 137. As shown in FIG. 3B, once housing 320 and locking plate 310 is pushed onto ferrule assembly 135, to form MPO micro connector 137, one or more hooks 322 act as a locking mechanism that engage MT ferrule edge 541 and secures MT ferrule assembly 135 to connector housing to form MPO micro connector 137 and locking plate 110 is latched into a widthwise groove 224.

Figure 4:
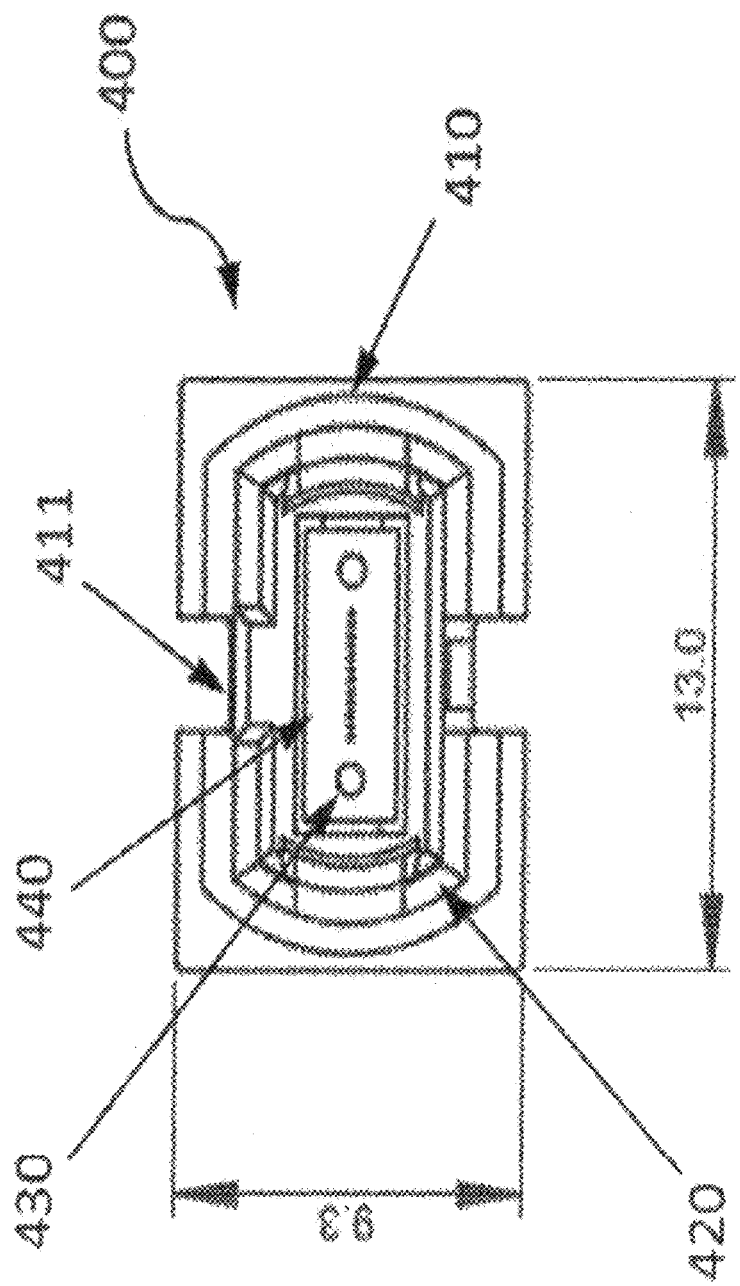
FIG. 4 is a front view of a multi-fiber push on (MPO) micro-latch-lock connector.

FIG. 4 shows a front view of micro-latch-lock system 400 to show further detail of housing 420 that may contain a recess (not shown) that substantially spans the width of the housing. The span necessary is a length of recess to capture a corresponding latch or hook to secure one portion to a second portion of connector assembly in the present invention. In a further embodiment, MPO locking plate 410 may include one or more first fastening mechanisms 411 is configured to interact with a groove (not shown) and attach locking plate 410 to housing 420. Housing 420 may also include one or more hooks (not shown) that interlock with MT ferrule 440. MT ferrule may have an MPO flat pin assembly within it 430. Accordingly, once housing 420 is pushed onto MT ferrule assembly 135, one or more hooks 222 (hooks not shown) act as a locking mechanism that secure assembly 135 in place to connector housing.

As shown in FIG. 5, embodiments as disclosed herein relate to a MPO micro-latch-lock connector system 500. As discussed herein, the system enables a micro connector to be used in a standard adapter 760, connector is secured using a latch-lock interface (511, 221, 224). Some embodiments, as disclosed herein may include a MPO locking plate 510, a MPO low profile connector housing 520, a MPO flat metal pin assembly 530, and a mechanical transfer (MT) ferrule boot 540. The MPO locking plate 510 further comprises a shroud 512 and a back surface 513. It should be understood that depicted micro-latch-lock system 500 is a non-limiting example of a micro-latch-lock system, and that other systems may include one, all, or some combination of the above-described components of the depicted micro-latch-lock system.

Referring to FIG. 3A, FIG. 5 and FIG. 8A, in FIG. 3A, MPO micro connector 300 is fully assembled in a locked position within an adapter (not shown). Latch 311 is in locking groove 221, and shroud 312 substantially covers outer housing recess 323 to ensure an adapter arm 770 (FIG. 7) does not release. By referring to FIG. 8A, all the components from spring 863 to boot 868 are removed, in addition inner and outer housings (860, 862) are replaced by a single housing 520, further reducing components and overall size. As ferrule 540 decreases in size, housing 520 and locking plate 510 can be reduced in size.

Referring to FIG. 5, ferrule 540 further comprises a boot 543 and an edge 541. Pin-keep 530 further comprise a guide opening 531. Upon assembly in the direction of arrows "A", ferrule boot 543 is secured through guide opening 531, and ferrule edge 541 snaps in at distal end of hook 522 located on one or more sides of housing 520. Ferrule assembly comprising pin-keep 530 and ferrule 540, is now secured in housing 520 when assembly engages hook 522. This assembly compares more favorably to FIG. 8A. In FIG. 8A, the ferrule 140, pin-keep 130, spring 863 and back body 864 are crimped together, then a boot 868 is inserted over the entire assembly. More assembly steps and components needed in the conventional MPO connector of FIG. 8A than of FIG. 1 of the present invention.

Figure 6:
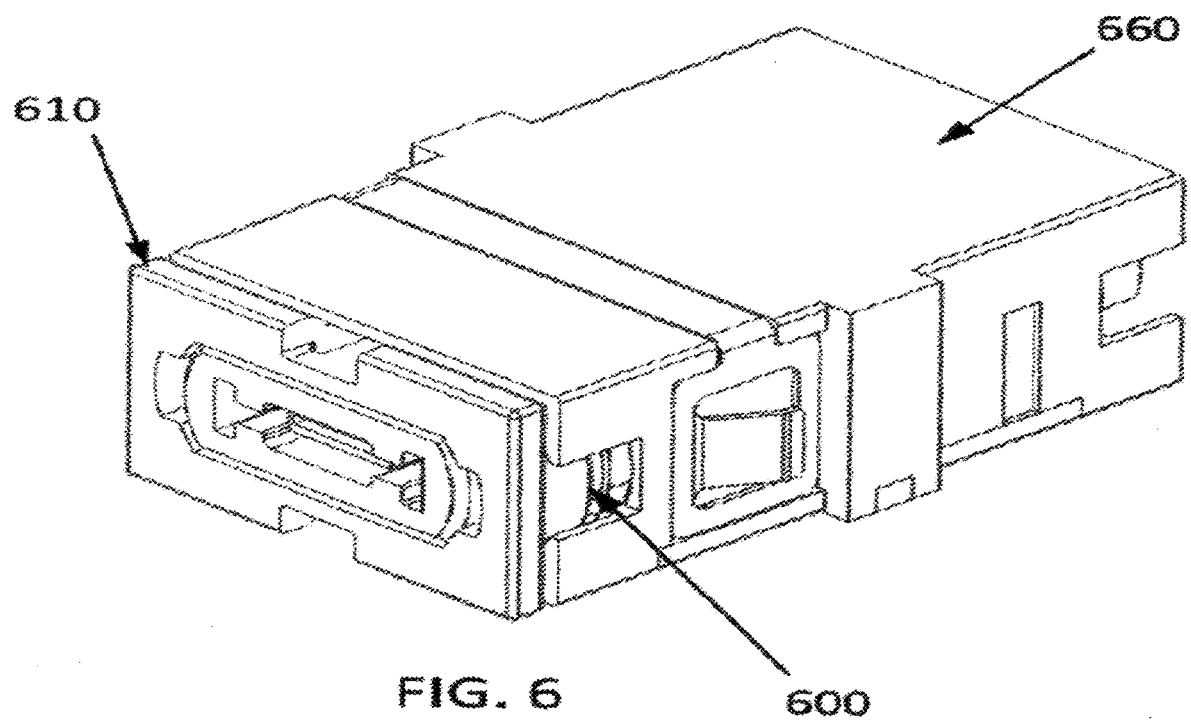
FIG. 6 is a perspective view of a multi-fiber push on (MPO) micro-latch-lock connector within a standard adapter.

FIG. 6 shows an additional illustrative view of some embodiments. Specifically, FIG. 6 shows a perspective view of MPO micro-latch-lock connector 600 as it would interact with a standard off the shelf adapter 660. As discussed herein, micro-latch-lock connector 600 may have a MPO locking plate 610.

Figure 7:
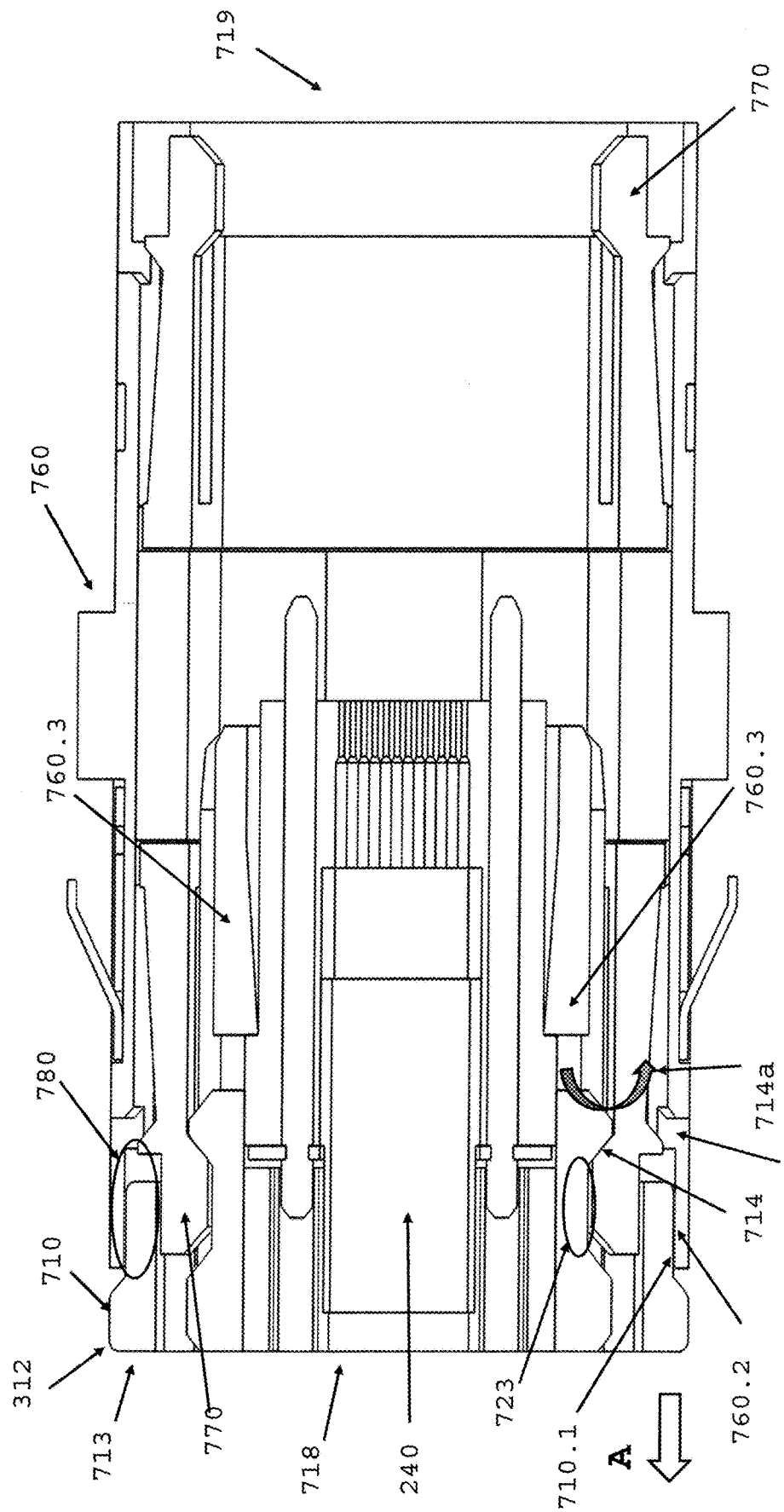
FIG. 7 is a top view of a multi-fiber push on (MPO) micro-latch-lock connector within a standard adapter of FIG. 6.

Referring now to FIG. 7, a top sectional view of an embodiment is shown where an MPO micro-latch-lock connector 700 interacts with an adapter 760. In some embodiments, adapter 760 may have or more connecting arms 770. One or more connecting arms 770 may be constructed of a flexible material and may be angled slightly toward the center of the adapter, as shown. In further embodiments, when connector 700 (refer to FIG. 3A) is inserted and secured into adapter 760, the one or more connecting arms 770 of the adapter may interact with one or more recesses 723 on the sides of the connector housing 720. This may allow connector 700 to be positioned in a particular static location within adapter 760 to ensure proper connection with a second connector, at an opposing end of the adapter housing (not inserted therein). In some embodiments, and as discussed herein, micro-latch-lock connector 700 may have a MPO locking plate 710. The MPO locking plate 710, as shown, may slide into a recess 780 on the adapter 760. The MPO locking plate 710, shroud 312 substantial covers the one or more connecting arms or adapter hooks 770, and the shroud helps prevent the arms from being forced from the one or more adapter recesses 780. Thus, in some embodiments, the MPO locking plate 710, may ensure that connector 700 and adapter 760 are securely connected and fastened together.

Continuing to refer to FIG. 7, adapter arms 770 are secured in recess 723 (refer to FIG. 3A at 323). In the locked position, shroud 312 covers arm 770 sufficiently enough to ensure arms 770 will not release when connector is in a locked configuration, as shown in FIG. 3A and installed in an adapter, as shown in FIG. 7. The connector is removed by pulling the back side 713 in the direction of the arrow "A", once the latch 511 is captured in release groove 224 (refer to FIG. 2A), the connector is pulled further. This results in adapter arms 770 with hooks, moving up (refer to arrow at 714*a*) along ramp surface 714, thereby allowing the connector to be removed from the adapter.

Figure 9:
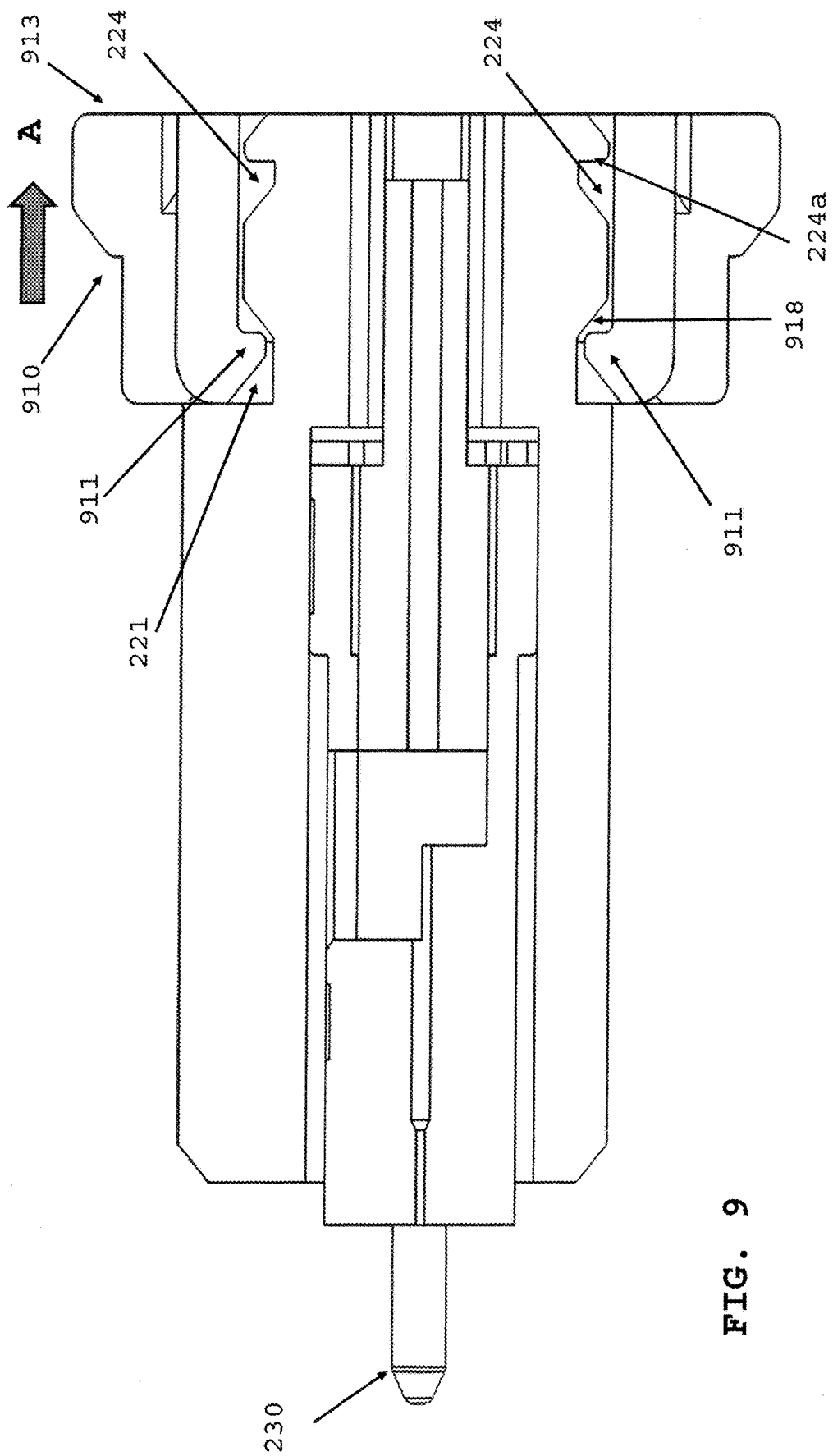
FIG. 9 is a cross-sectional view of FIG. 3A.

Referring to FIG. 9 to remove MPO micro connector 300, the user pulls on back surface 913, and fastening mechanism 911 lifts along a ramp 918, and further pulling in the direction of the arrow "A", latch 911 falls into the release groove 224. The latch is secured in release groove 224 when latch engages surface 224*a*, which acts as a stop.

Referring to FIG. 7, locking plate shroud surface 710.1 forms an additional lock with adapter housing inner surface 760.2 to further secure the micro connector within adapter 760. Adapter 760 further comprises latching arms 760.3 that further secure and position housing 220 comprising ferrule assembly 135 and locking plate 110 into adapter housing 760.1 to help ensure reduced signal loss. In some embodiments, adapter 760 may be able to connect to connectors, such as 700, on each of a first end 718 and a second end 719. Each of the first end and the second end may have similar components as those shown in FIG. 7.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," et cetera). While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (for example, the bare recitation of "two recitations," without other modifiers, means at least two recitations, or two or more recitations). Furthermore, in those instances where a convention analogous to "at least one of A, B, and C, et cetera" is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, et cetera). In those instances where a convention analogous to "at least one of A, B, or C, et cetera" is used, in general such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, et cetera). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, et cetera As a non-limiting example, each range discussed herein can be readily broken down into a lower third, middle third and upper third, et cetera As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A locking plate comprising:
   a shroud partially extending circumferential at a first end of the locking plate;
   a back side at a second end of the locking plate;
   at least one fastening mechanism positioned on a side of the locking plate, wherein the fastening mechanism is configured to engage and latch to a first groove located at an outer surface of a connector housing when the connector is fully inserted into an adapter; and
   wherein a second groove is located distal of the first groove, the second groove secures the locking plate to the connector housing during removal of the connector from the adapter.

2. The locking plate according to claim 1, wherein the second groove is configured to prevent the locking plate from being separated from the connector housing during removal of the connector from the adapter.

3. A connector assembly resulting in the configuration of claim 1.

4. A method of removing a connector assembly from an adapter comprising:
   providing the connector assembly according to claim 3;
   pulling distally on a backside of a locking plate;
   sliding locking plate until a first or second fastening mechanism engages a second recess on a surface of a connector housing; and
   pulling connector at a proximal end out of an adapter.

* * * * *